United States Patent
Ji et al.

(10) Patent No.: US 8,520,620 B2
(45) Date of Patent: Aug. 27, 2013

(54) RESOURCE MAPPING METHOD AND APPARATUS OF OFDM SYSTEM

(75) Inventors: Hyoung Ju Ji, Seoul (KR); Joon Young Cho, Gyeonggi-do (KR); Jin Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 44 days.

(21) Appl. No.: 13/097,589

(22) Filed: Apr. 29, 2011

(65) Prior Publication Data

US 2011/0268062 A1    Nov. 3, 2011

(30) Foreign Application Priority Data

Apr. 29, 2010    (KR) .................. 10-2010-0039936

(51) Int. Cl.
*H04W 4/00*      (2009.01)
(52) U.S. Cl.
USPC ......................................... 370/329; 370/328
(58) Field of Classification Search
None
See application file for complete search history.

(56) References Cited

U.S. PATENT DOCUMENTS

| | | | | |
|---|---|---|---|---|
| 8,064,386 B2 * | 11/2011 | Pan et al. | .................. | 370/328 |
| 8,300,587 B2 * | 10/2012 | Chmiel et al. | ................ | 370/329 |
| 2009/0052387 A1 * | 2/2009 | Lee et al. | ..................... | 370/329 |
| 2010/0062783 A1 * | 3/2010 | Luo et al. | ...................... | 455/450 |

OTHER PUBLICATIONS

Qualcomm Europe: "UL ACK/NACK Assignment Procedure", 3GPP TSG-RAN WG1 #54, R1-083176, Aug. 18-22, 2008.
Nokia Siemens Networks, Nokia: "Considerations on PUCCH Indexing Scheme for LTE TDD", 3GPP TSG RAN WG1 Meeting #53bis, R1-082602, Jun. 30-Jul. 4, 2008.
Samsung: "R-PDCCH Multiplexing and Search Space", 3GPP TSG RAN WG1 Meeting #59bis, R1-100135, Jan. 18-22, 2010.
Samsung: "DL Backhaul Design for Type I Relay", 3 GPP TSG RAN WG1 Meeting #58bis, R1-094100, Oct. 12-16, 2009.

* cited by examiner

*Primary Examiner* — David Oveissi
(74) *Attorney, Agent, or Firm* — The Farrell Law Firm, P.C.

(57) ABSTRACT

A method and apparatus for allocating resource between uplink ACK/NACK channel and downlink control channel supporting spatial multiplexing in an OFDM-based wireless communication system which configures uplink ACK/NAK channel implicitly using reference signals for discriminating among resource allocation spaces and physical channel resource. The method is capable of multiplexing the uplink ACK/NACK channel associated with the control channel extended by spatial multiplexing into the uplink ACK/NACK channel resource which does not support spatial multiplexing.

14 Claims, 12 Drawing Sheets

FIG. 3
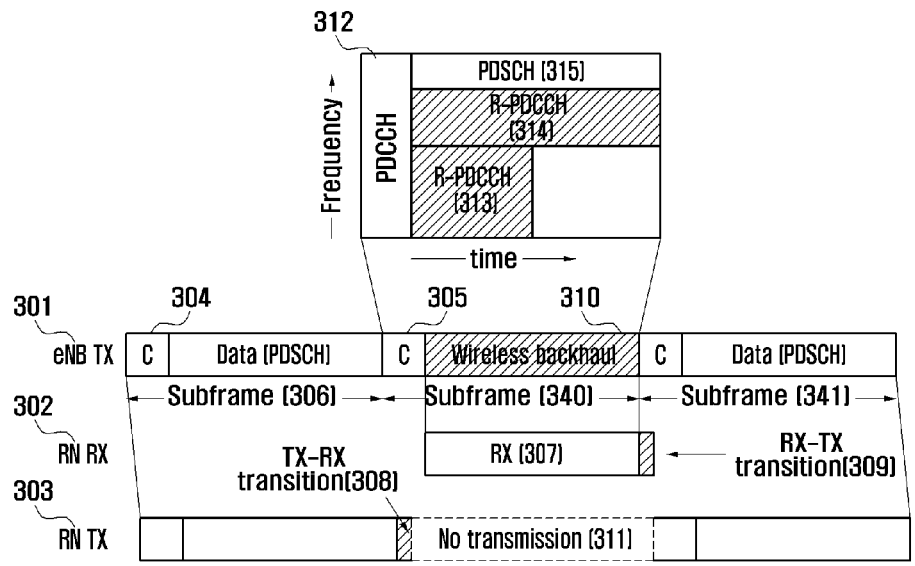
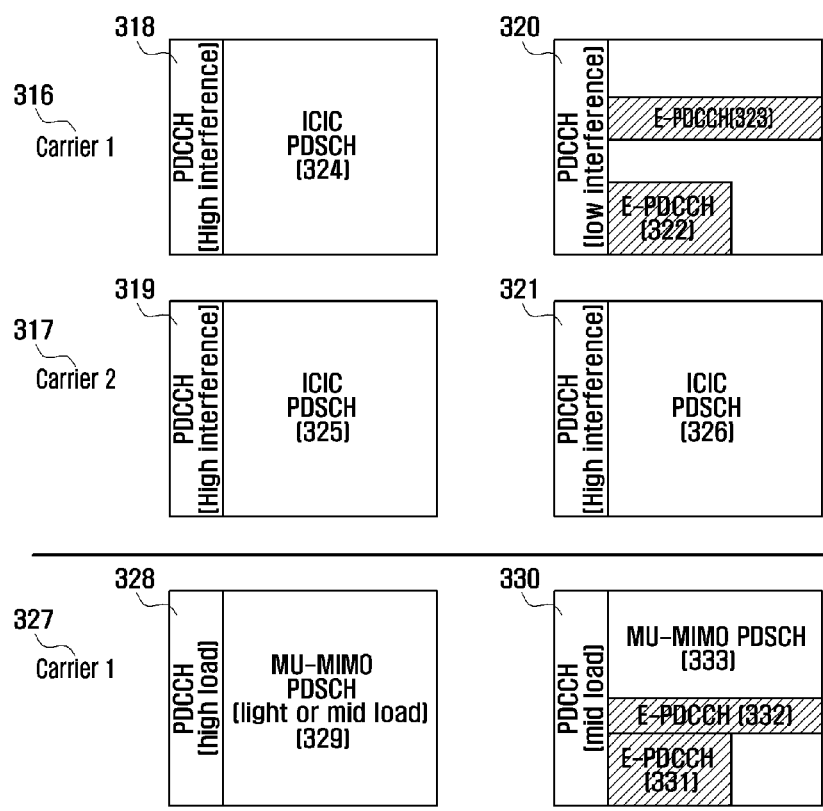

RESOURCE MAPPING METHOD AND APPARATUS OF OFDM SYSTEM

PRIORITY

This application claims priority under 35 U.S.C. §119(a) to an application filed in the Korean Intellectual Property Office on Apr. 29, 2010 and assigned Serial No. 10-2010-0039936, the entire disclosure of which is incorporated herein by reference.

BACKGROUND OF THE INVENTION

1. Field of the Invention

The present invention relates generally to a resource mapping method and apparatus of an Orthogonal Frequency Division Multiplexing (OFDM) communication system and, more particularly, to a method and apparatus for allocating uplink ACK/NACK response channel resource for control channel supporting Spatial Division Multiplexing Access (SDMA).

2. Description of the Related Art

Mobile communication systems have developed to provide subscribers with voice communication services, on the move. As the technologies have advanced, mobile communications have evolved to support high-speed data communication services as well as the standard voice communication services. However, there is a need of a more sophisticated mobile communication system to mitigate resource shortage and meet the high-speed service requirements of the subscribers.

Long Term Evolution (LTE) is a next generation broadband communication technology developed by the $3^{rd}$ Generation Partnership Project (3GPP). LTE is designed to provide for a downlink speed of up to 100 Mbps and is expected to be commercially launched in 2010. In order to fulfill the requirements for the LTE systems, studies have been done in various aspects including minimization of the number of involved nodes in the connections and placing the radio protocol as close as to the radio channels.

Inter-Cell-Interference-Coordination (ICIC) is a technique introduced in LTE to reduce Inter-Cell Interference (ICI) by sharing information on the currently used data channel resource among the cells, thereby keeping the inter-cell interferences under control of base station. In an LTE system, the resource is assigned to each user in unit of Resource Block (RB) for data channel but distributively across the entire system bandwidth in unit of Resource Element Group (REG) for control channel, it is impossible to apply the ICIC for control channel. In contrast, the LTE-Advanced (LTE-A) system as the evolved version of LTE system supports the extended control channel so as to configure the control channel in consideration of ICIIC. Such a control channel is assigned in a similar way to the data channel so as to make possible to use spatial multiplexing of the control channel with multi-antenna and beamforming unlike the LTE control channel. The resource extended by spatial multiplexing cannot be assigned for the uplink ACK/NACK channel which is configured by mapping to an individual Control Channel Element (CCE) one by one in the legacy LTE control channel. There is therefore a need of a method for making possible to configure channel between the control channel supporting spatial multiplexing and uplink ACK/NACK channel in the LTE-A and multiplexing the uplink ACK/NACK channels in the legacy LTE system.

SUMMARY OF THE INVENTION

An aspect of the present invention is to address at least the above-mentioned problems and/or disadvantages and to provide at least the advantages described below.

Accordingly, an aspect of the present invention is to provide a resource mapping method and apparatus of an OFDM system that is capable of allocating resource between uplink ACK/NACK channel and downlink control channel supporting spatial multiplexing and allocating independent spatially distributed physical resource for uplink ACK/NACK, resulting in dynamical resource sharing with the legacy LTE ACK/NACK channel and improvement of resource efficiency.

In accordance with an aspect of the present invention, a resource mapping method of a transmitter is provided. The resource mapping method includes allocating dedicated control resources for allocating uplink response resource according to resource indices and Dedicated Reference Signal (DRS) port indices in dedicated control channel region, and transmitting the dedicated control channel region as mapped in data channel region.

In accordance with another aspect of the present invention, a resource utilization method of a receiver is provided. The resource utilization method includes receiving control information in a dedicated control channel region of a data channel region, demodulating data received in the data channel region by analyzing the control information, determining response resource using dedicated control resources allocated according to resource indices and Dedicated Reference Signal (DRS) port indices in the dedicated control channel region, and transmitting demodulation result of the data using the response resource.

In accordance with another aspect of the present invention, a resource mapping apparatus of a transmitter is provided. The resource mapping apparatus includes Dedicated Reference Signal (DRS) ports corresponding to respective DRS port indices, a controller which allocates dedicated control resources for allocating uplink response resource according to resource indices and the DRS port indices in dedicated control channel region, and a multiplexer which transmits the dedicated control channel region as mapped in a data channel region.

In accordance with another aspect of the present invention, a resource utilization apparatus of a receiver is provided. The resource utilization apparatus includes a receiving processor which receives control information in a dedicated control channel region of a data channel region, a demodulator which demodulates data received in the data channel region by analyzing the control information, a resource selector which determines response resource using dedicated control resources assigned according to indices of resource in the dedicated control channel region and Dedicated Reference Signal (DRS) port indices, and a controller which controls to transmit demodulation result of the data using the response resource.

BRIEF DESCRIPTION OF THE DRAWINGS

The above and other objects, features and advantages of the present invention will be more apparent from the following detailed description in conjunction with the accompanying drawings, in which:

FIG. 3 is a diagram illustrating the use of subframe of the LTE-A system to which the present invention is directed.

In the drawings like reference numerals are used to depict the same or similar elements, features, and structures.

DETAILED DESCRIPTION OF EMBODIMENTS OF THE PRESENT INVENTION

Various embodiments of the present invention will be described in detail below with reference to the accompanying drawings. The following description is provided to assist in a comprehensive understanding of embodiments of the present invention as defined by the claims and their equivalents. The description includes various specific details to assist in the understanding of the present invention, which are merely exemplary. Accordingly, those of ordinary skill in the art will recognize that various changes and modifications of the embodiments described herein can be made without departing from the scope and spirit of the invention. In addition description of well-known functions and constructions is omitted for clarity and conciseness.

In the embodiments of the present invention, an LTE system is a system adopting the aforementioned OFDM in downlink and Single Carrier-Frequency Division Multiple Access (SC-FDMA) in uplink. Further, LTE-A system is a system evolved from the LTE system to use multiple carriers.

Figure 1:
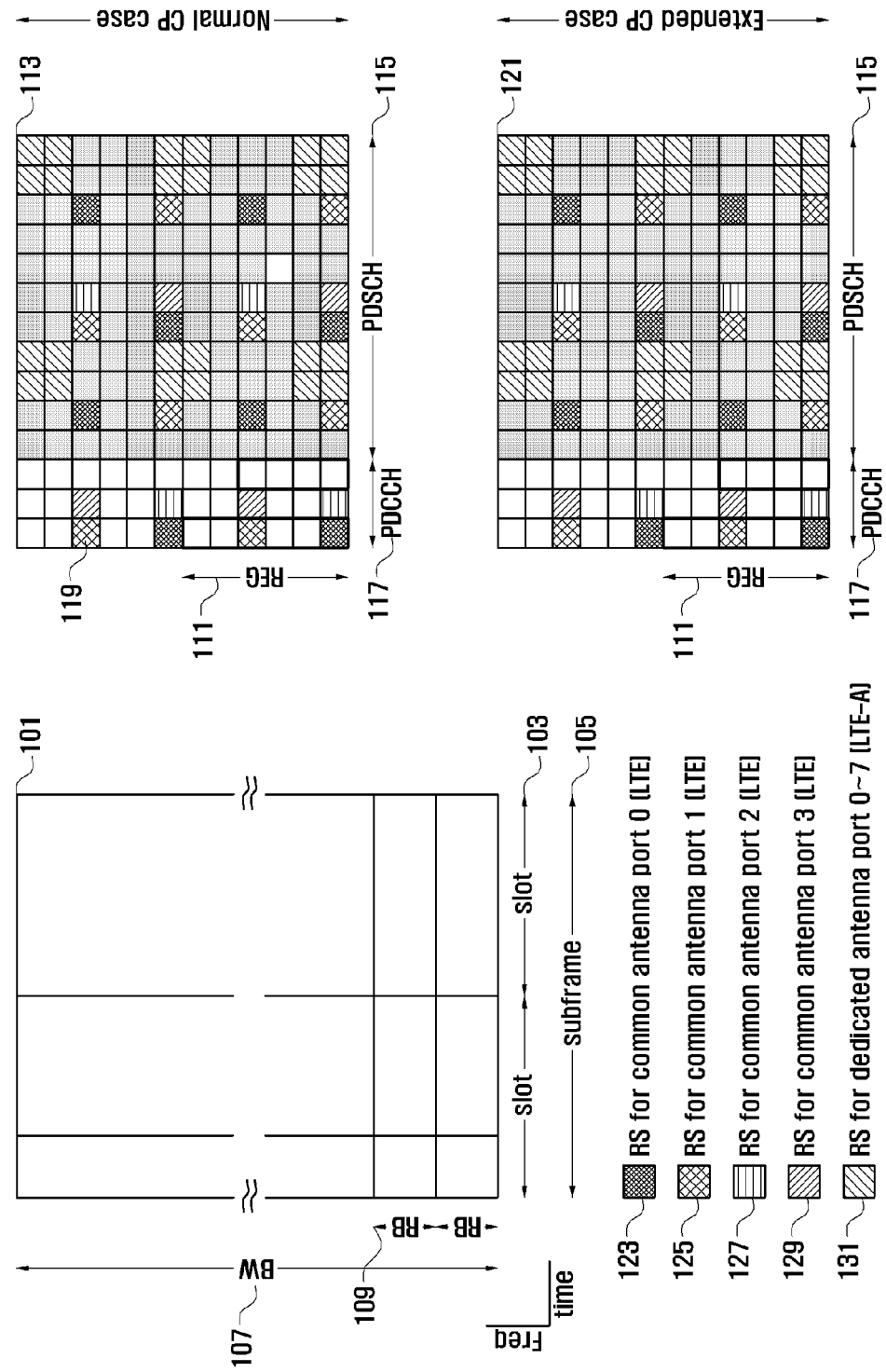
FIG. 1 is a diagram illustrating configurations of subframes for use in the LTE and LTE-A system to which the present invention is directed.

FIG. 1 is a diagram illustrating configurations of subframes for use in the LTE and LTE-A system to which the present invention is directed.

Referring to FIG. 1, the entire LTE transmission bandwidth 107 is composed of a plurality of Resource Blocks (RBs), and each RB 109 (or 113) is composed of 12 frequency tones arranged in a frequency domain and 14 OFDM symbols 113 or 12 OFDM symbols 121 and a basic unit of resource allocation. A subframe 105 has a length of 1 ms and is composed of two slots 103. The subframe consisted of 14 OFDM symbols is referred to as normal cyclic prefix (CP) subframe 113, and the subframe consisting of 12 OFDM symbols is referred to as extended CP subframe 121.

An evolved Node B (eNB) transmits Reference Signals 119 in the subframe 105. The reference signals include Common Reference Signals (CRSs) 123, 125, 127, and 129. The CRSs 123, 125, 127, and 129 are the reference signals transmitted by the eNB distributively across the entire bandwidth by means of individual antenna ports 0, 1, 2, and 3 as negotiated with User Equipment (UEs). Where the number of antennas is one or more, a multi-antenna is used. The absolute positions of the CRSs 123, 125, 127, and 129 arranged on the frequency axis in an RB are configured differently per the cell, but the relative distance between CRSs 123, 125, 127, and 129 is maintained at regular intervals. That is, the CRSs for the same antenna port are arranged at an interval of 6 RBs while the absolute positions of the CRSs are different per cell, which avoids inter-cell interference of the CRSs.

The number of CRSs is determined differently per the antenna port such that there are 8 CRSs for each of the antenna ports 0 and 1 and 4 CRSs for each of the antenna ports 2 and 3. When using 4 antennas, the channel estimation accuracy with the antenna ports 2 and 3 is bad as compared to the channel estimation accuracy with the antenna ports 0 and 1.

In addition to the CRSs 123, 125, 127, and 129, Dedicated Reference Signal (hereinafter, referred to as "DRS") is another type of reference signal. The DRS is transmitted in Physical Resource Block (PRB) assigned to the recipient but not across the entire system bandwidth. The receiver can perform data channel demodulation with the DRS received. The DRS is the reference signal used for transmission with beamforming to a specific receiver. The DRS is used in the LTE-A system.

In the LTE-A system, a total of 24 Resource Elements (REs) are assigned for DRS in a subframe, and the 24 DRSs are used for up to 8 antennas multiplexed. The LTE UE can use the CRSs 123, 125, 127, and 129 but not the DRS, and the LTE-A UE can use both the CRS and DRS.

The control channel signal is arranged at the beginning of each subframe in time domain. In FIG. 1, the reference number 117 denotes the region in which the control channel (referred to as PDCCH) is carried. The control channel signal is carried in the L OFDM symbols at the beginning of the subframe. The value of L can be 1, 2, or 3. In FIG. 1, the control signal region 117 is composed of 3 OFDM symbols. Where one OFDM symbol is allocated for the control signal due to the small amount of control channel information (L=1), the rest 13 OFDM symbols of the subframe is used for data channel transmission. The value of L is used as the basic information for demapping the control channel from the control channel resource in the reception process such that, if the value of L is not received, it is impossible to recover the control channel. The reason why the control signal is located at the beginning of the subframe is first to notify the UE of the information on whether there is the data channel signal transmitted to the UE such that the UE can determine whether to perform the operation for receiving data channel signal. If there no data channel signal transmitted to the UE, it is not necessary for the UE to perform the operations for receiving data channel signal so as to save power consumption. Also, since the UE can receive the control channel quickly as compared to the data channel, it is possible to reduce the scheduling delay.

The LTE standard specifies three downlink control channels: Physical Control Format Indicator Channel (PCFICH), Physical Hybrid ARQ Indicator Channel (PHICH), and Physical Downlink Control Channel (PDCCH) that are transmitted in the control region 117 in unit of Resource Element Group (REG) 111 in FIG. 1.

The PCFICH is a physical channel for transmitting a Control Channel Format Indicator (CFI). The CFI is a 2-bit indicator for indicating L, i.e., the number of symbols assigned for a control channel in a subframe. Since the number of symbols assigned for the control channel is indicated by the CFI, all of the UEs have to receive the CFI first in the subframe except when the downlink resource is allocated semi-persistently. Also, since the value of L can be acquired from the PCFICH, the PCFICH should be transmitted in the first OFDM symbol of each subframe. The PCFICH is divided into 4 parts for 16 subcarriers and transmitted across the entire bandwidth.

The PHICH is a physical channel for transmitting a downlink ACK/NACK signal. The PHICH is received by the UE which is transmitting data in uplink. Accordingly, the number of PHICHs is in proportion to the number of UEs that are transmitting in uplink. The PHICH can be transmitted in the first OFDM symbol ($L_{PHICH}=1$) or across three OFDM symbols ($L_{PHICH}=3$). The information on the PHICH (number of symbols, $L_{PHICH}$) is transmitted from the eNB to the UEs within the cell at the initial access. Like the PCFICH, the PHICH is transmitted in positions designated per cell. Accordingly, the PHICH can be received after receipt of Primary Broadcast Channel (PBCH) information regardless of other control channels.

The PDCCH 117 is a physical channel for transmitting data channel allocation information and/or power control information. The PDCCH 117 can be configured with a different channel-coding rate according to the channel condition of the UE. Since the eNB uses Quadrature Phase Shift Keying (QPSK) as a fixed modulation scheme of the PDCCH, it is required to change the amount of resources allocated for the PDCCH in order to change the channel-coding rate. That is, the base station uses a high channel-coding rate for the mobile terminal of which channel conditions are good so as to reduce the amount of resources for data transmission. In contrast, the base station uses a low channel-coding rate for the mobile terminal of which channel conditions are bad in order to increase the reception probability of the mobile terminal even at the cost of large amounts of resources. The resource amount assigned for each PDCCH is determined in units of Control Channel Element (CCE). A CCE consists of a plurality of REGs 111. The REG 111 of the PDCCH 117 is placed in the control channel region 117 after being interleaved to obtain diversity gain. The PDCCH 117 includes scheduling information for a signal receiver, and the UE receives PDSCH 115 using the scheduling carried in the PDCCH 117 and notifies the eNB of whether the PDSCH is received successfully. For this purpose, the CDE of PDCCH 117 is mapped to resource for the ACK/NACK PUCCH (Physical Uplink Control Channel) indicating whether the PDSCH is received successful.

In order to multiplex several ACK/NACK signals, the Code Domain Multiplexing (CDM) technique is applied for the PHICH. In a single REG, 8 PHICH signals are multiplexed into 4 real number parts and 4 imaginary number parts by means of the CDM technique and repeated as many as $N_{PHICH}$ so as to be distributed in the frequency domain to obtain frequency diversity gain. By using $N_{PHICH}$ REGs, it is possible to form the 8 or less PHICH signals. In order to form more than 8 PHICH signals, it is necessary to use other $N_{PHICH}$ REGs.

After assigning the PCFICH and PHICH, a scheduler determines the value of L, maps the physical channels to the REG 111 of the assigned control channel region 117 based on the value of L, and performs interleaving to obtain frequency diversity gain. The interleaving is performed on the total REGs 111 of the subframe 101 determined by the value of L in units of REG in the control channel region 117. The output of the interleaver in the control channel region 117 is capable of preventing Inter-Cell Interference (ICI) caused by using the same interleaver for the cells and obtaining the diversity gain by distributing the REGs 111 of the control channel region 117 across one or more symbols. Also, it is guaranteed that the REGs 111 forming the same control channel are distributed uniformly across the symbols per control channel.

Figure 2:
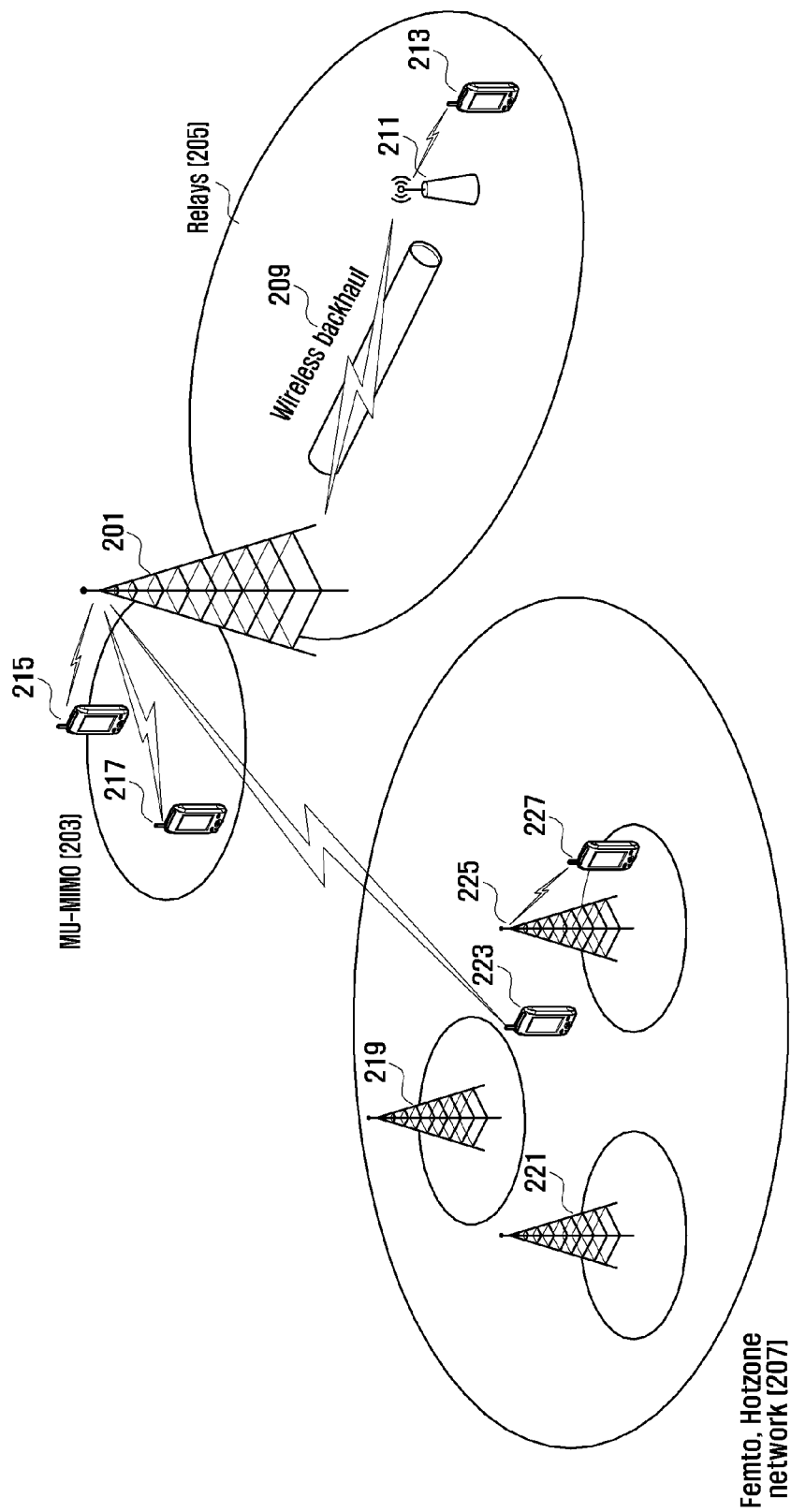
FIG. 2 is a diagram illustrating a radio environment scenario considered in LTE-A to which the present invention is directed.

FIG. 2 is a diagram illustrating a radio environment scenario considered in LTE-A to which the present invention is directed.

Referring to FIG. 2, LTE-A is extended from LTE in three concepts: extension to multicarrier transmission, improvement of multi-user multiplexing, and extension to heterogeneous network. In the first concept, the entire bandwidth is extended by using multiple carriers. In the second concept, the transmit capacity of multiuser MIMO (MU-MIMO) by means of multiuser multiplexing. This is to improve the resource efficiency by transmitting data, on the same resource that is spatially separated, to the UEs 215 and 217 experiencing spatially independent channels using SDMA. In the third concept, the system is extended to the heterogeneous network. The heterogeneous network is the system including transmitters such as relay 205, femto cell, and hotzone cell 207. The relay 211 is deployed in a macro cell and connected to a macro eNB 201 via wireless backhaul 209 for data transmission, and the relay 211 is deployed at a shadow area without the macro cell or cell boundary to support the UE 213 located far from the macro eNB 201. The femto cell or hotzone cell is deployed to guarantee high data rate to the UE 223 located indoor by deploying tiny base station 219, 221, and 227 operating at low transmit power level. The LTE-A system is required to support such techniques to maximize the system throughput. There are some problems to adopt these techniques to LTE downlink control channel, and the description is made of these problems with reference to FIG. 3

FIG. 3 is a diagram illustrating a configuration of the downlink control channel in a system having femto and hotzone cells and supporting MU-MIMO for explaining the problems to extend to a heterogeneous system.

FIG. 3 shows timings of data transmission from an eNB to a relay node via wireless backhaul as denoted by reference number 301 and the data relay of the relay node as denoted by reference number 302 and 303. In part 301 of FIG. 3, the subframes 306 and 341 are used for the transmission to a UE, and the subframe 340 is used for the transmission to the relay node. The relay node can receive the data transmitted by the eNB in the subframe 340 as illustrated in part 302 of FIG. 3. Assuming that the relay node cannot transmit and receive data simultaneously, the relay node can transmit data to the UE attached to it by avoiding the region 311. Since the relay node can transmit and receive data simultaneously, there is a need of transition times for Transmission-Reception (Tx-RX) transition and Rx-Tx transition. Due to the transition times, the relay node cannot receive in the period in which the control channel 305 is transmitted in the subframe transmitted by the eNB on the wireless backhaul. Accordingly, the relay node cannot receive the LTE control channel. In order to solve this problem, a relay-dedicated control channel 313 for the relay node is configured in the subframe. The relay-dedicated control channel is multiplexed with the PDSCH 315 so as to follow the PDCCH in time domain. The relay-dedicated control channel is referred to as R-PDCCH which is newly defined in LTE-A.

Parts 316 and 317 of FIG. 3 shows the control channel interference occurring in femto and hotzone cells. As described with reference to FIG. 2, in the heterogeneous network in which tiny base stations are deployed in the macro cell, it is obvious that interference increases. Although the inter-cell interference of data channels can be mitigated using ICIC PDSCHs 324 and 325, the ICIC technique is not adopted to the controls channels such that the UE is likely to fail to receive control channel due to the interference increased in the cell.

In the present invention, this problem is addressed with the multi-carrier concept (carrier 1 and carrier 2) adopted to LTE-A by transmitting the control channel experiencing high interference via the carrier 2 and adjusting transmit power of the carrier 1 to mitigate interference. Here, the control channel 321 cannot not be used such that an indicator for indicating the data channel information on the carrier 2 is carried in the control channel of carrier 1. Here, however, since the resource for the control channel of carrier 1 is limited, resource shortage occurs. In order to overcome this resource shortage, the control channel is inserted in the data channel region as denoted by reference numbers 322 and 323. Such a control channel is referred to as Enhanced-PDCCH (E-PDCCH) which is newly defined in LTE-A standard.

Part 327 of FIG. 3 shows the control channel resource shortage in the subframe of the eNB supporting MU-MIMO. In order to maximize the MU-MIMO performance of the control channel, a large number of UEs are scheduled in the subframe. This causes the increase of control channels and thus it becomes difficult to maximize the MU-MIMO performance of data channel only with the PDCCH region. Here, the control channel may carry high load as denoted by reference number 328 while the data channel carries relatively low or intermediate load as denoted by reference number 329, such that it can be considered to increase multiplexing capacity by assigning resource for the new control channel for LTE-A in the data channel region as denoted by reference numbers 331 332. Such a control channel is referred to as E-PDDCH which is newly defined in LTE-A standard.

As described above, since the new control channel required defined in the LTE-A system is multiplexed with the data channel, SDMA is necessary. With this control channel configuration, it is difficult to reuse the uplink ACK/NACK resource allocated by means of the LTE control channel.

Although the following description is directed to the UE for simplicity purposes, the present invention can be directed to the relay node as well as the UE.

Figure 4:
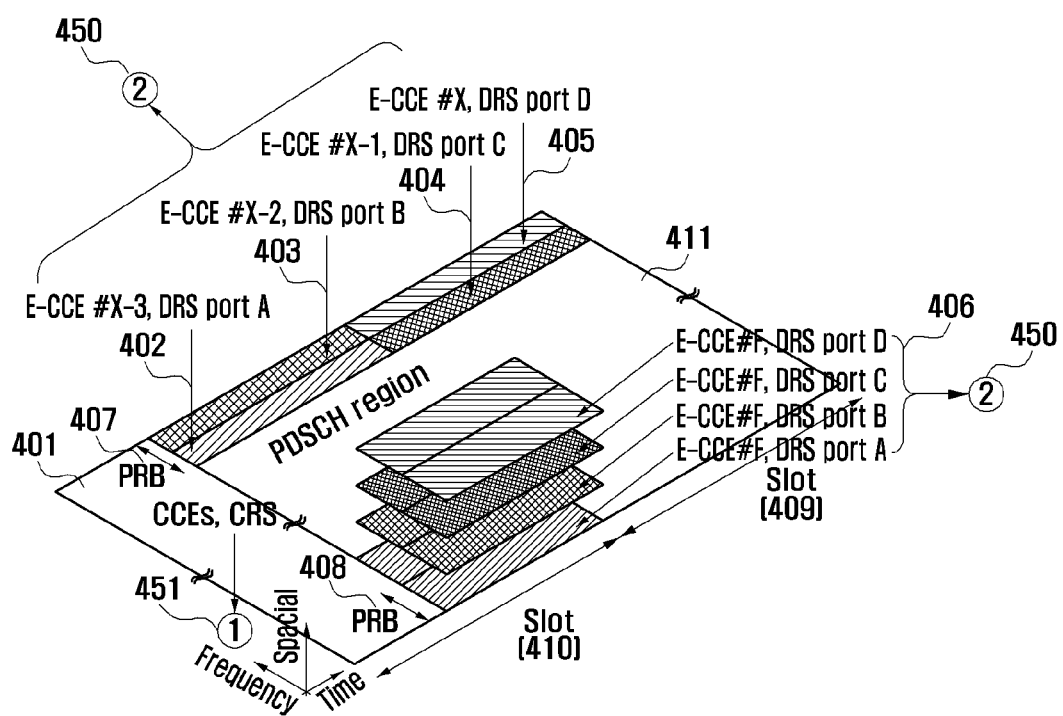
FIG. 4 is a diagram illustrating a relationship between LTE-A control channel and DRS port according to an embodiment of the present invention.
Figure 5:
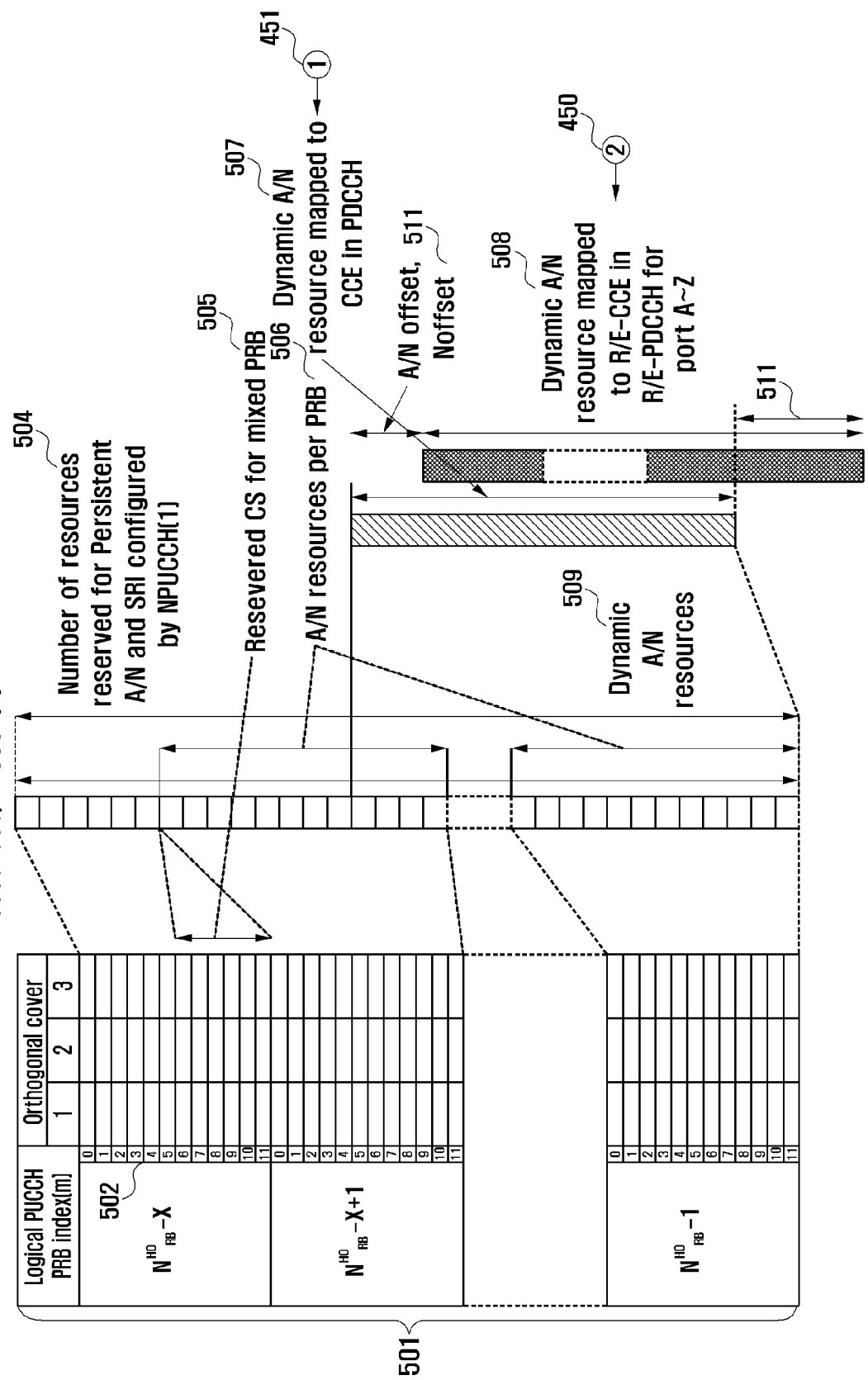
FIG. 5 is a diagram illustrating the mapping relationship between the LTE-A control channel and the ACK/NACK channel according to an embodiment of the present invention.

FIGS. 4 and 5 are diagrams illustrating uplink ACK/NACK channel resource allocation for LTE-A control channel according to an embodiment of the present invention.

FIG. 4 shows a configuration of an Enhanced/Relay PDCCH (E/R-PDCCH) which is newly introduced control channel of LTE-A.

Referring to FIG. 4, the E/R-PDCCHs multiplexed in the PDSCH 411 of a subframe as denoted by reference numbers 402 to 406. Here, it can be considered to map the E/R-PDCCH to the entire region of the subframe or to the first slot of the subframe. One PRB 407 can be composed of a plurality of Enhanced CCE (E-CCE). In FIG. 4, the PRB 407 consists of 4 E-CCEs. The PRB 408 is composed of a single E-CCE. One E-CCE can be used for a plurality of DRS ports. That is, a single E-CCE resource can be used for four users with 4 DRS ports. Although the E-CCEs 402 to 405 are discriminated by individual DRS ports, each E-CCE resource can be used for two DRS ports such that the signals for total 8 users can be multiplexed into one PRB when total 8 DRS ports exist. The PDCCH transmitted in the control region is composed of a plurality of CCEs in LTE system and the downlink ACK/NACK channel is assigned resource from the basis of the lowest CCE index among the assigned CCEs.

FIG. 5 shows the mapping relationship between the LTE-A control channel and the ACK/NACK channel according to an embodiment of the present invention.

Referring to FIG. 5, the uplink ACK/NACK resource is configured as denoted by reference number 501. The system determines the RB to be used for uplink ACK/NACK resource, and the amount corresponds to X PRBs. One PRB is configured as a combination of 23 cyclic shifts 502 and 3 orthogonal covers 503 such that 36 ACK/NACK resources are assigned in a single PRB. The eNB determines the cyclic shift distance between adjacent ACK/NACK channels in consideration of current channel status, i.e. delay spread of the channel, so as to minimize the interference between adjacent ACK/NACK channels. Where the distance is 3, the number of ACK/NACK resources available in a single PRB is 12. The index of available ACK/NACK resource except the region of the mixed resource as denoted by reference number 505 after configuring the ACK/NACK channel in the allocated PRB 501 is $N_{PUCCH}^{(1)}$. The amount of $N_{PUCCH}^{(1)}$ is preconfigured for use in semi-persistent ACK/NACK and Scheduling Request Indication (SRI). Accordingly, the control channel used by the UE which has received the control channel, i.e. CCE index $n_{PUCCH}^{(1)}$, in downlink can be expressed by Equation (1):

$$n_{PUCCH}^{(1)} = n_{CCE} + N_{PUCCH}^{(1)} \tag{1}$$

where $n_{CCE}$ denotes the index of a CCE, and $N_{PUCCH}^{(1)}$ denotes a number of CCEs in downlink control channel.

Once the resource corresponding to the number of CCEs that can be used in PDCCH region of a subframe is secured, it is possible to use the resource without collision. That is, the ACK/NACK resource allocated according to the CCEs 451 is mapped to the resource 507. In an embodiment of the present invention, the ACK/NACK resource mapped to the E-CCEs 450 for LTE-A can be allocated so as to overlap entirely or partially with the ACK/NACK resource of the legacy LTE or independently from the ACK/NACK resource of the legacy LTE. The overlapped part is the shared resource and the non-overlapped part is the resource extendedly assigned for LTE-A. Where the entire resource is allocated independently, this means there is no shared resource. Accordingly, when the DRS port is not considered, the resource can be allocated by Equations (2), (3), and (4).

When the resources are overlapped entirely, by Equation (2):

$$n_{PUCCH}^{(1)} = (n_{E-CCE} \% N_{CCE}) + N_{PUCCH}^{(1)} \tag{2}$$

where $n_{PUCCH}^{(1)}$ denotes the index of the ACK/NACK resource, $n_{E-CCE}$ denotes the index of E-CCE, % denotes modular function, and $N_{CCE}$ denotes the number of CCEs in R/E-PDCCH, and NPUCCH denotes the number of ACK/NACK resources.

When the resources are overlapped partially, by Equation (3):

$$n_{PUCCH}^{(1)} = (n_{E-CCE} \% (N_{CCE} - N_{offset}) + N_{offset} + N_{PUCCH}^{(1)} \tag{3}$$

When the resources are allocated independently, by Equation (4):

$$n_{PUCCH}^{(1)} = n_{E-CCE} + N_{CCE} + N_{PUCCH}^{(1)} \tag{4}$$

where $n_{CCE}$ denotes the total amount of resource allocated for LTE ACK/NACK transmission, and Noffset denotes the amount of resource reserved in some part of the resource allocated for the LTE ACK/NACK transmission so as not to be used for LTE-A. That is, the resource between $N_{PUCCH}^{(1)}$ and $N_{offset}$ is secured so as not to be used for LTE-A. this is to guarantee the performance of the LTE ACK/NACK resource.

Equations (2), (3), and (4) can be applied when using CRS or single DRS port, as well as to the embodiments described hereinafter.

The first embodiment is directed to a method for mapping E-CCE and ACK/NACK resource in DRS port index first order when DRS port is used. That is, this method is to pre-allocate the ACK/NACK resource up to the total amount of E-CCE available and maximum number of DRS ports for E-CCE and to multiplex the pre-allocated resource with LTE ACK/NACK resource. If the ACK/NACK resource is mapped in DRS port index first order and if UEs use different E-CCEs, the eNB assigns different DRS ports such that the ACK/NACK resources for the UEs are distant as far as possible from each other. The UE can be assigned E-CCEs in a pre-determined search space region which can be shared by another UE and overlapped with the resource allocated for LTE PDCCH. Accordingly, in the case that the ACK/NACK resource is preoccupied by another UE so as not to use, the eNB can allocate the ACK/NACK resource overlapped even when using the other DRS port as well as the other CCEs which are not used in the search space. Where the adjacent ACK/NACK resources are close even between the DRS ports, the resources of the ACK/NACK channels used by the UE multiplexed into a single E-CCE are adjacent with each other, resulting in degrading ACK/NACK channel demodulation performance.

For example, the E-CCE index can increment sequentially by DRS port such that the ACK/NACK resource is allocated in ascending order of the DRS port index. Also, the DRS port index can increment sequentially by E-CCE such that the ACK/NACK resource is allocated in ascending order of E-CCE index.

Figure 6:
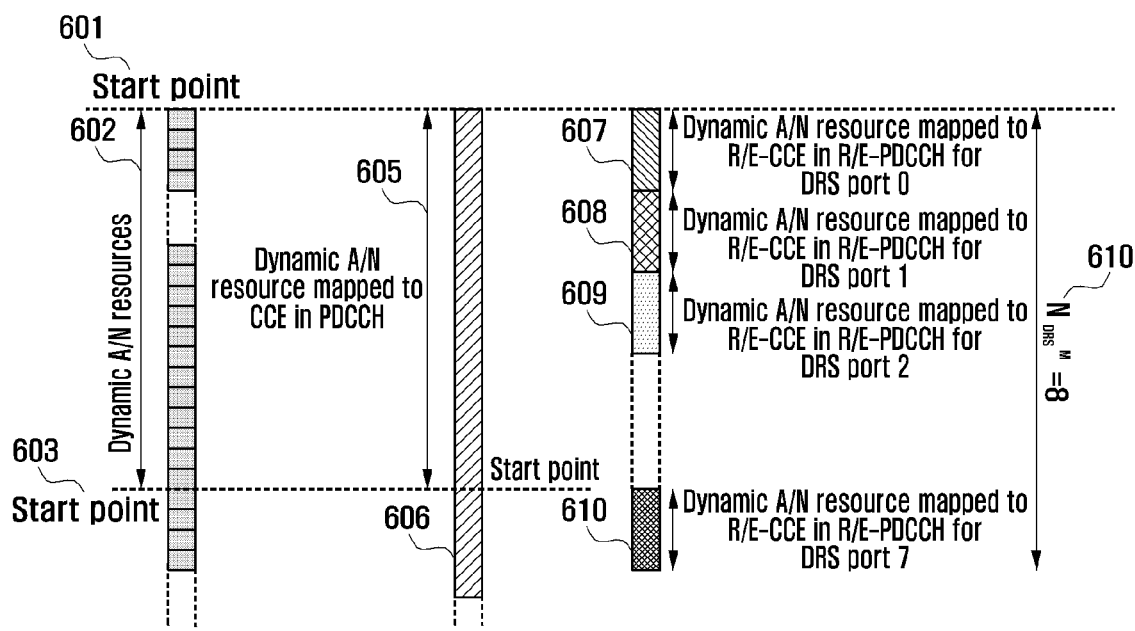
FIG. 6 is a diagram illustrating a principle of ACK/NACK resource mapping in order of DRS port index according to the first embodiment of the present invention.

FIG. 6 is a diagram illustrating a principle of ACK/NACK resource mapping in order of DRS port index according to the first embodiment of the present invention.

In FIG. 6, reference number 602 denotes the amount of resource allocated for ACK/NACK resources 509 and reference number 601 denotes the start point of index. Reference numbers 607 to 610 denote the E-CCEs of respective DRS ports. Reference number 607 denotes the E-CCE for the DRS port 1, the E-CCE for DRS port 2 is arranged contiguously, and so on such that all the resources for all of the DRS ports are configured. Where there is a large number of DRS ports, the start point of ACK/NACK resource allocation as denoted by reference number 606 is cyclic-shifted to reuse. Reference numbers 607 and 610 denotes the cases using total 8 DRSs. Accordingly, resource allocation can be performed by Equations (5), (6), and (7).

When the resources are overlapped entirely, by Equation (5):

$$n_{PUCCH}^{(1)} = ((N_{DRS}^{MAX} n_{E-CCE} + n_{CCE}) \% N_{CCE}) + N_{PUCCH}(1) \quad (5)$$

where $N_{DRS}^{MAX}$ denotes a number of DRS ports of eNB.

When the resources are overlapped partially, by Equation (6):

$$n_{PUCCH}^{(1)} = ((N_{DRS}^{MAX} n_{E-CCE} + n_{CCE}) \% (N_{CCE} - N_{offset})) + N_{offset} + N_{PUCCH}^{(1)} \quad (6)$$

When the resources are allocated independently, by Equation (7):

$$n_{PUCCH}^{(1)} = (N_{DRS}^{MAX} n_{E-CCE} + n_{DRS}) + N_{CCE} + N_{PUCCH}^{(1)} \quad (7)$$

The eNB can use up to 8 DRS ports, and resource allocation for all of these can cause resource waste. Accordingly, it is considered to reduce the entire amount of resource to be allocated with the notification to the UE by higher layer signaling. In case, the resource allocation can be performed by Equations (8), (9), and (10).

When the resources are overlapped entirely, by Equation (8):

$$n_{PUCCH}^{(1)} = ((N_{DRS}^{M} n_{E-CCE} + n_{CCE}) \% N_{CCE}) + N_{PUCCH}^{(1)} \quad (8)$$

When the resources are overlapped partially, by Equation (9):

$$n_{PUCCH}^{(1)} = ((N_{DRS}^{M} n_{E-CCE} + n_{CCE}) \% (N_{CCE} - N_{offset})) + N_{offset} + N_{PUCCH}^{(1)} \quad (9)$$

When the resources are allocated independently, by Equation (10):

$$n_{PUCCH}^{(1)} = (N_{DRS}^{M} n_{E-CCE} + n_{DRS}) + N_{CCE} + N_{PUCCH}^{(1)} \quad (10)$$

where $N_{DRS}^{M}$ is notified by higher layer signaling for resource allocation and $N_{DRS}^{M} = \{1, 2, 4, 8\}$. That is, when $N_{DRS}^{M}$ is 2, the resource for total 2 DRS is preserved. Where the number of actually used DRSs is two or more, the probability of collision with the ACK/NACK resource increases, but it can be suppressed by allocating different DRS port indices and E-CCE indices.

The resource allocation also can be expressed as follows. For example, Equation (5) can be replaced by Equation (11).

When the resources are overlapped entirely, by Equation (11):

$$n_{PUCCH}^{(1)} = (N_{E-CCE} \% N_{CCE}) + N_{PUCCH}^{(1)}$$
$$N_{E-CCE} = N_{DRS}^{M} n_{E-CCE} + n_{DRS} \quad (11)$$

The second embodiment of the present invention is directed to the method increasing resource efficiency by allocating resource as many as the E-CCEs to be used and arranging the resource by cyclic-shifting as much as the maximum number of DRSs.

Figure 7:
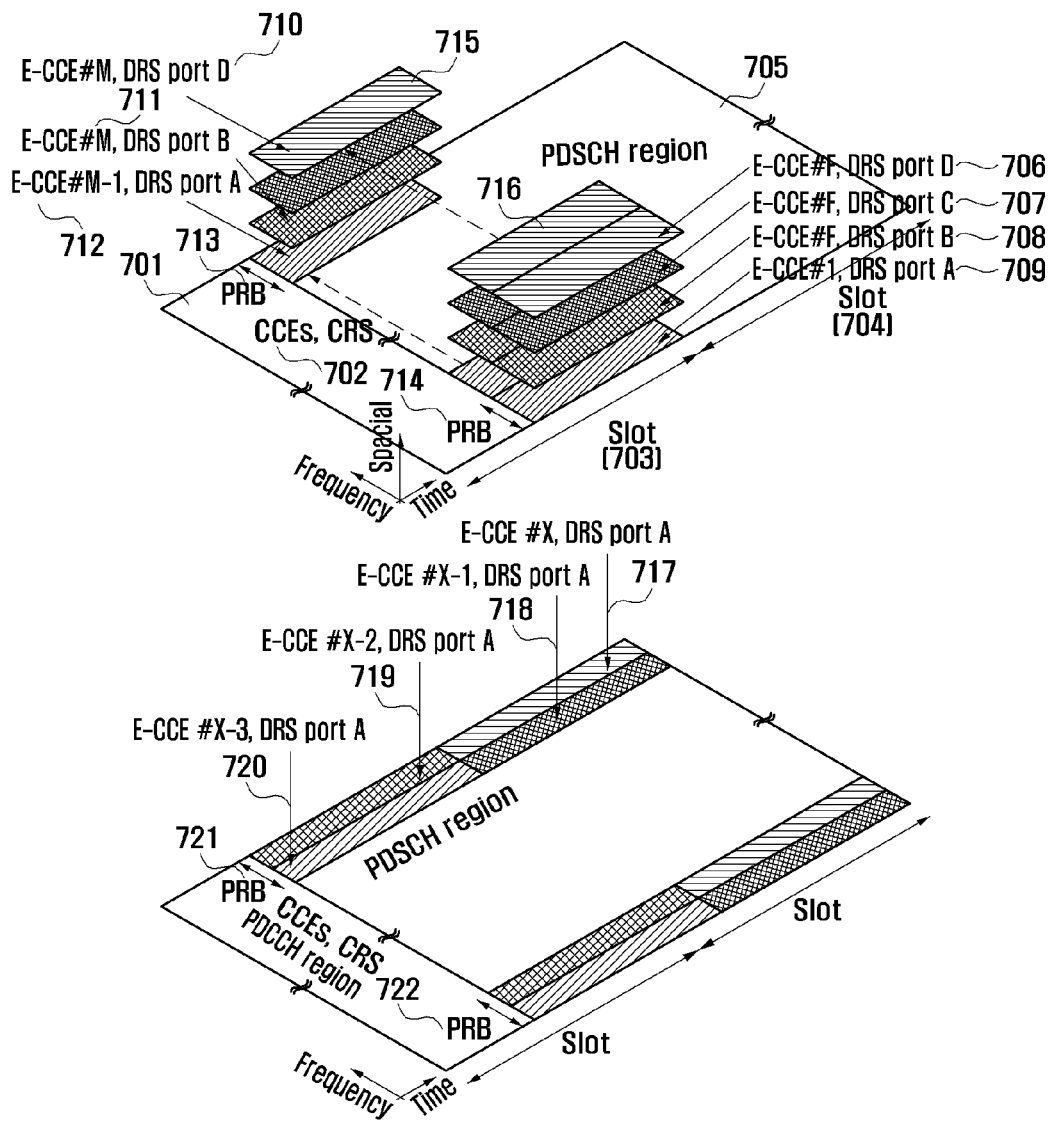
FIG. 7 is a diagram illustrating a principle of using available control channels and DRS ports according to an embodiment of the present invention.

FIG. 7 is a diagram illustrating a principle of using available control channels and DRS ports according to an embodiment of the present invention.

Figure 8:
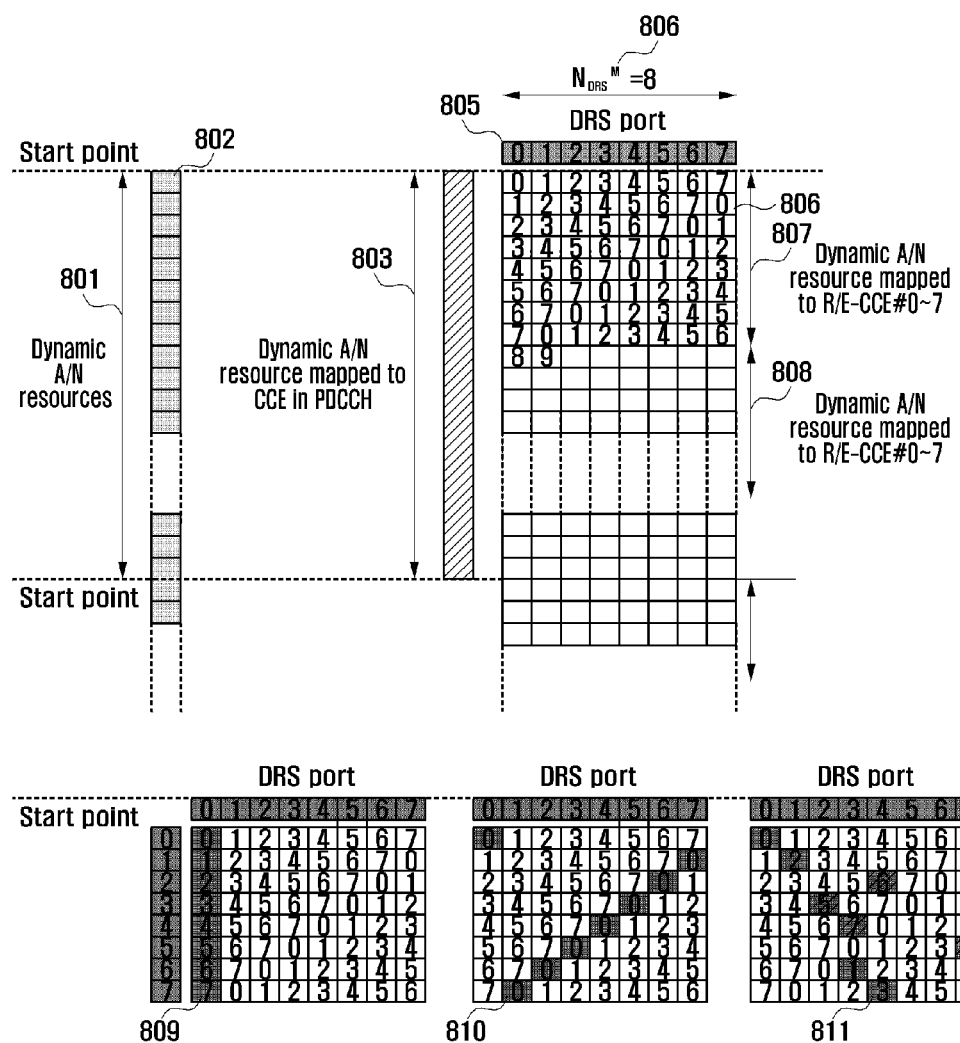
FIG. 8 is a diagram illustrating a mapping relationship between the cyclic shifted E-CCE and ACK/NACK according to the second embodiment of the present invention.

Referring to FIG. 7, the E-CCE adopting SDMA can be used in three resource allocation ways. First, a single E-CCE can shared by plural users discriminated by DRS ports as denoted by reference numbers 706 to 708. Second, the users can be assigned different E-CCEs but use the same DRS port. Finally, these two methods can be mixed. The method pre-allocating resource as much as the total DRS ports per E-CCE as described in the first embodiment is likely to waste resource since the resource as much as 6 to 8 times greater than the resource of the LTE ACK/NACK channel is pre-allocated. In order to overcome the structural problem, the resource can be configured as illustrated in FIG. 8. That is, the DRS ports are multiplexed per E-CCE and mapped to the ACK/NACK resource.

FIG. 8 is a diagram illustrating a mapping relationship between the cyclic shifted E-CCE and ACK/NACK according to the second embodiment of the present invention.

Referring to FIG. 8, reference number 801 denotes the entire resource used for ACK/NACK resource allocation 803 in LIE, and reference number 802 denotes the start point of resource allocation. Reference numbers 807 to 809 denotes the mappings of the E-CCE resource to the ACK/NACK resource. Reference number 807 resource mapping of the E-CCE indices 0 to 7, and one ACK/NACK resource is virtually configured with up to 8 DRS ports. That is, the ACK/NACK index 0 is used according to the DRS port 805 used with the E-CCEs 0 to 7, e.g., the ACK/NACK resource index 0 can be used when the CCE index is 3 and the DRS port 3 is used. The second ACK/NACK resource is arranged by cyclic-shifting the first ACK/NACK resource as much as 1 E-CCE, and the same method arranges by cyclic-shifting as much as the maximum available DRS ports.

In the arrangement, when eight users are using the same DRS port or CRS with different E-CCEs as denoted by reference number 809, it is possible to allocate different ACK/NACK resource. Also, when eight users are using the same E-CCE with different DRS ports as denoted by reference number 810, it is possible to use different ACK/NACK channels. In an case where two users are spatially multiplexed in a single E-CCE, it is possible for eight users can use the ACK/NACK resource in two E-CCEs. This can be expressed by Equations (12), (13), and (14).

When the resources are overlapped entirely, by Equation (12):

$$n_{PUCCH}^{(1)} = (N_{DRS}^{MAX} \cdot \text{floor}(n_{E\text{-}CCE}/N_{DRS}^{MAX}) + (n_{DRS} + n_{E\text{-}CCE})\%N_{DRS}^{MAX})\% N_{CCE} + N_{PUCCH}^{(1)} \quad (12)$$

where floor denotes the floor function.

When the resources overlapped partially, by Equation (13):

$$n_{PUCCH}^{(1)} = ((N_{DRS}^{MAX} \cdot \text{floor}(n_{E\text{-}CCE}/N_{DRS}^{MAX}) + (n_{DRS} + n_{E\text{-}CCE})\%N_{DRS}^{MAX})\%(N_{CCE} - N_{offset})) + N_{offset} + N_{PUCCH}^{(1)} \quad (13)$$

When the resources are allocated independently, by Equation (14):

$$n_{PUCCH}^{(1)} = N_{DRS}^{MAX} \cdot \text{floor}(n_{E\text{-}CCE}/N_{DRS}^{MAX}) + (n_{DRS} + n_{E\text{-}CCE})\%N_{DRS}^{MAX} + N_{CCE} + N_{PUCCH}^{(1)} \quad (14)$$

Like the first embodiment, it is possible to limit the number of the DRS ports to be multiplexed in the second embodiment, and this can be expressed by Equations (15), (16), and (17).

When the resources are overlapped entirely, by Equation (15):

$$n_{PUCCH}^{(1)} = (N_{DMRS}^{M} \cdot \text{floor}(n_{E\text{-}CCE}/N_{DRS}^{M}) + (n_{DRS} + n_{E\text{-}CCE})\%N_{DRS}^{M})\% N_{CCE} + N_{PUCCH}^{(1)} \quad (15)$$

When the resources are overlapped partially, by Equation (16):

$$n_{PUCCH}^{(1)} = ((N_{DRS}^{M} \cdot \text{floor}(n_{E\text{-}CCE}/N_{DRS}^{M}) + (n_{DRS} + n_{E\text{-}CCE})\%N_{DRS}^{M})\%(N_{CCE} - N_{offset})) + N_{offset} + N_{PUCCH}^{(1)} \quad (16)$$

When the resources are allocated independently, by Equation (17):

$$n_{PUCCH}^{(1)} = N_{DRS}^{M} \cdot \text{floor}(n_{E\text{-}CCE}/N_{DRS}^{M}) + (n_{DRS} + n_{E\text{-}CCE})\%N_{DRS}^{M} + N_{CCE} + N_{PUCCH}^{(1)} \quad (17)$$

where $N_{DRS}^{M}$ is notified by higher layer signaling for resource allocation and, $N_{DRS}^{M} = \{1, 2, 4, 8\}$.

In the above-described embodiment, DRS port is the reference signal for discriminating among spatial resources and can be designed to discriminate among the resources physically identical with different scrambling codes as well as to discriminate between the physically separated resources. Here, $n_{DRS}$ is expressed as $n_{DRS'}$ and $n_{SCID}$ where $n_{DRS'}$ indicates the currently used DRS and $n_{SCID}$ is the scrambling code. Therefore, $$n_{DRS} = n_{DRS'} \text{ or } n_{DRS} = n_{SCID} * n_{DRS'} + n_{SCID}.$$

In this embodiment, it is assumed that the E/R-PDCCH is transmitted across the entire downlink bandwidth. Here, it is not needed for the eNB to signal which resource is used for E/R-PDCCH. The eNB can use some part of the entire downlink bandwidth for E/R-PDCCH. That is, the eNB can use at least one PRB for E/R-PDCCH within the entire downlink bandwidth. Here, the eNB notifies the UE of an index of used resource by means of RRC signaling.

According to an embodiment of the present invention, the $n_{E\text{-}CCE}$s is calculated in consideration of the actual position of the allocated resource. For example, PRB indices 10 and 11 are notified by RRC signaling, one PRB is substituted by one CCE. Here, the formula for substituting PRB with CCE is transmitted from the eNB to the UE in the system information and can be stored in the cell. Although the total number of CCEs is 2, $n_{E\text{-}CCE}$ uses the indices 10 and 11 under the assumption of the use of the entire bandwidth. Here, the $N_{offset}$ is set to the same value for the users within the cell.

In an embodiment of the present invention, the $n_{E\text{-}CCE}$ is calculated in consideration of the number of allocated resources. For example, when PRB indices 10 and 11 is informed by RRC signaling, the total number of CCEs is 2, and the $n_{E\text{-}CCE}$ uses 0 and 1 under the assumption that the number of the actually allocated resource is considered. Here, the PRB cannot be substituted with CCE. That is, there is no need for the eNB either to transmit the any formula for substituting PRB with CCE to the UE or to save the formula. Here, $N_{offset}$ is set to different values for different uses within the cell.

Figure 9:
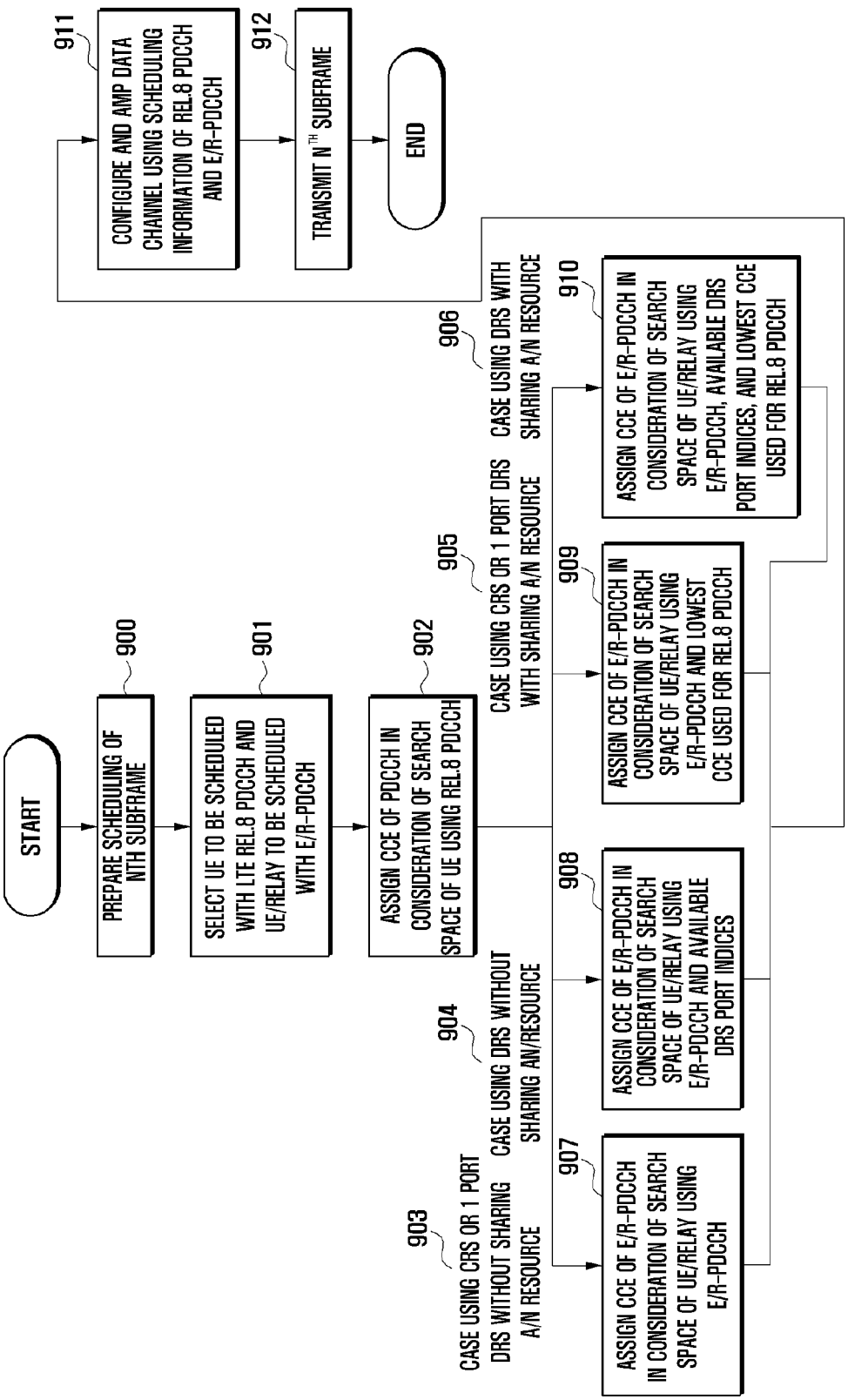
FIG. 9 is a flowchart illustrating operations of the transmitter of the eNB according to an embodiment of the present invention.

FIG. 9 is a flowchart illustrating operations of the transmitter of the eNB according to an embodiment of the present invention.

Referring to FIG. 9, the eNB prepares for scheduling in the $N^{th}$ subframe in step 900. Next, the eNB discriminate among the UEs to be scheduled with LTE PDCCH and E-PDCCH and relay nodes to be scheduled with R-PDCCH and then selects one of the UEs or relay nodes in step 901. Next, the eNB assigns CCEs of PDCCH in consideration of the search space of the UE to which the LTE PDCCH is transmitted in step 902.

Where CRS is used without sharing LTE-A ACK/NACK resource or using one DRS port, the eNB checks this in step 903 and assigns the CCEs of E/R-PDCCH in consideration of the search space of the UE or relay node using the E/R-PDCCH in step 907.

Where one or more DRS ports are used without sharing the ACK/NACK resource, the eNB checks this in step 904 and assigns the CCEs of the E/R-PDCCH in consideration of the and the search space of the UE or relay node using the E/R-PDCCH and available DRS port indices in step 908. Here, the ACK/NACK resource allocation method described in the first and second embodiment is applied to allocate the ACK/NACK resource without collision.

If the ACK/NACK resources are shared entirely or partially and if one CRS or DRS port is used, the eNB checks this in step 905 and allocates E-CCEs to the UE or relay node using the E/R-PDCCH in consideration of the CCE index of the PDCCH used for the LTE PDCCH allocated at step 901 in step 909. If the ACK/NACK resources are shared entirely or partially and if one or more DRS ports are used, the eNB checks this in step 906 and allocates the E-CCE of E/R-PDCCH in consideration of the search space of the UE or relay node, available DRS port index, and CCE index used for LTE PDCCH in step 910.

After completing resource allocation, the eNB allocates resources for data channel using the scheduling information in step 911. Finally, the eNB transmits the $N^{th}$ subframe.

Figure 10:
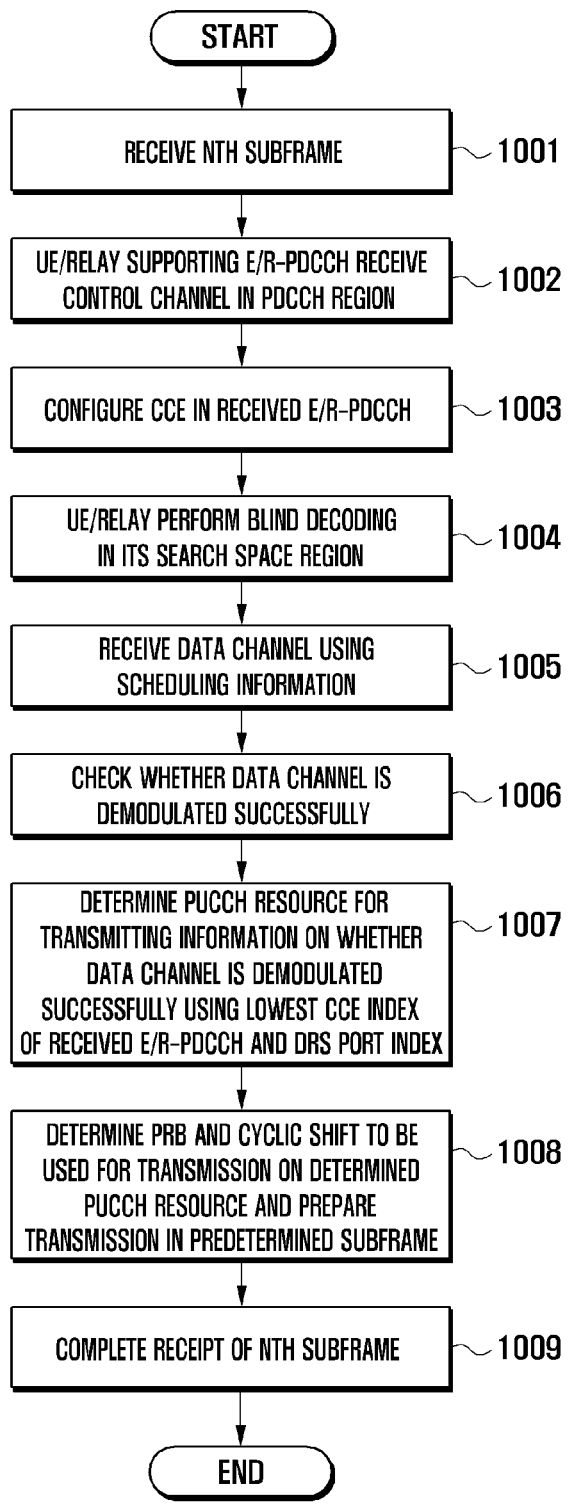
FIG. 10 is a flowchart illustrating operations of the receiver of a UE or relay node according to an embodiment of the present invention.

FIG. 10 is a flowchart illustrating operations of the receiver of a UE or relay node according to an embodiment of the present invention.

Referring to FIG. 10, the UE or relay node starts receiving $N^{th}$ subframe in step 1001. The UE or relay node, which has received the control channel in the E/R-PDCCH region, receives the control channel in the data channel region and demodulates the control channel in step 1002. Next, the UE or relay node recovers the CCEs in the received E/R-PDCCH in step 1003. The UE or relay node searches its search space for the CCE carrying its scheduling information among the recovered CCEs in step 1004. Here, the UE or relay node can perform blind decoding to search the search space.

Next, the UE or relay node receives data channel using the scheduling information carried in its CCE in step 1005. Sequentially, the UE or relay node determines whether the data channel is decoded successfully in step 1006. Next, the UE or relay node checks the uplink response channel resource to be used for uplink transmission using the lowest CCE index of E/R-PDCCH, type of antenna to be used for transmission, and DRS port index in step 1007. That is, the UE or relay node selects the ACK/NACK resource for transmitting the information on whether the data channel is decoded successfully in the uplink control channel region. Next, the UE or relay node prepares transmission of the information on whether the scheduled data channel is decoded successfully, in a predetermined subframe in step 1008. Here, the predetermined subframe can be $(N+4)^{th}$ subframe, but not limited thereto. Here, the UE or relay node determines the PRB and cyclic shift for used in transmission of the information on whether the data channel is demodulated successfully. Finally, the UE or relay node completes the receipt of the $N^{th}$ subframe in step 1009.

Figure 11:
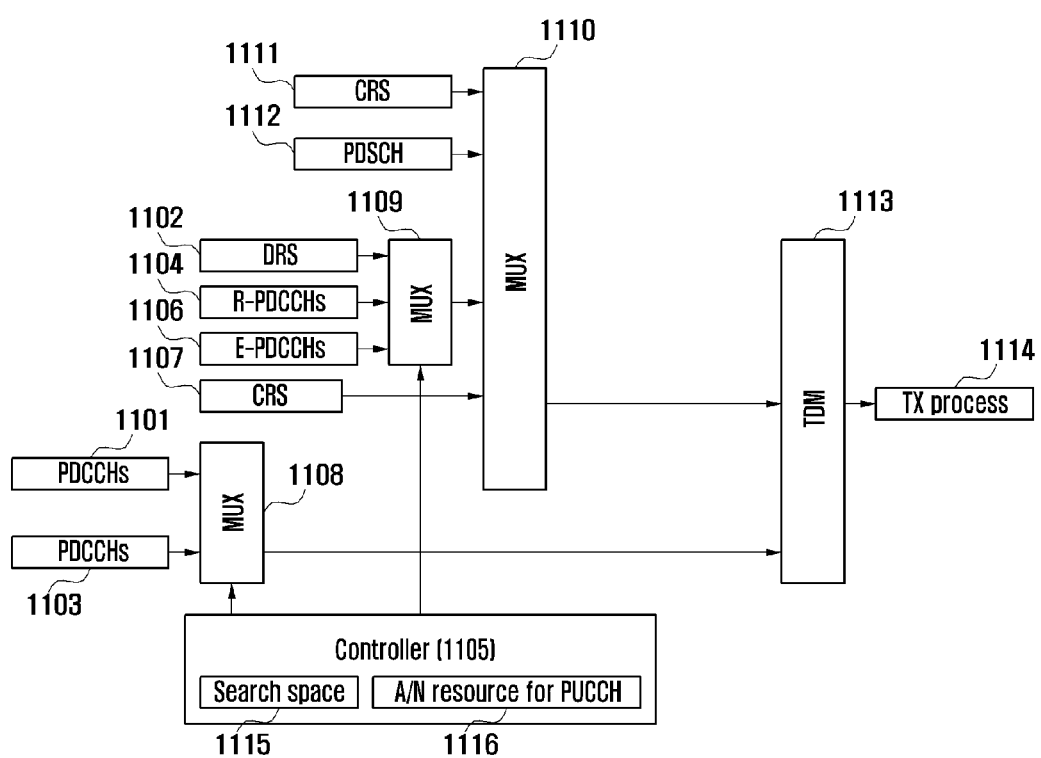
FIG. 11 is a diagram illustrating a configuration of the transmitter of the eNB according to an embodiment of the present invention.

FIG. 11 is a diagram illustrating a configuration of the transmitter of the eNB according to an embodiment of the present invention.

As illustrated in FIG. 11, the eNB includes PDCCH generators 1101 and 1103, DRS ports 1102, an R-PDCCH generator 1104, a D-PDCCH generator 1106, CRS generator 1107 and 1111, a controller 1105, multiplexers (MUXs) 1108, 1109, and 1110, a PDSCH generator 1112, a Time Division Multiplexer 1113, and a transmit (Tx) processor 1114.

The PDCCH generators 1101 and 1103 generate LTE PDCCHs. The control unit 1105 gathers the PDCCHs generated by the PDCCH generators 1101 and 1103 and transfers the PDCCHs to the control region multiplexer 1108. The control region multiplexer 1108 multiplexes the PDCCHs into the control channel region. The controller 1105 is provided with a search space determiner 1115 and an ACK/NACK resource determiner 1116. The search space determiner 1115 determines the search spaces individual UE and/or relay node, and the ACK/NACK resource determiner 1116 determines the ACK/NACK resources for the UE and/or relay node. The controller 1105 determines the positions of the CCEs of the control channel in the multiplexing process in consideration of the search space and ACK/NACK resources of the UE and/or relay node.

The DRS ports 1102 generate DRSs, the R-PDCCH generator 1104 generates R-PDCCHs, and the E-PDCCH generator 1106 generates E-PDCCHs. The controller 1105 transfers the DRSs, R-PDCCH or E-PDCCH to the LTE-A control channel multiplexer 1109. The LTE-A control channel multiplexer 1109 multiplexes the DRS and R-PDCCH or E-PDCCH. The CRS generators 1107 and 1111 generate CRSs to be transmitted in the data channel region. The PDSCH generator 1112 generates PDSCH to be transmitted in the data channel region. The data region multiplexer 1110 multiplexes data into the data channel region.

The TDM 1113 configures a subframe in Time Division Multiplexing manner. The Tx processor 1114 transmits the subframe.

In the transmitter of the eNB according to an embodiment of the present invention, the controller 1105 performs scheduling by matching each of the E-CCEs for the receivers including UEs and relay nodes with the index of at least one of the DRS ports 112. If the E-CCEs of the receivers have the same index and match with different DRS ports 1102, the controller 1105 allocates one PRB to the EC-CCEs. If the E-CCEs of the receivers have different indices and match with the same DRS port 1102, the controller 1105 allocates one PRB per E-CCE. The controller 1105 also controls such that the E-CCEs are transmitted as multiplexed into the data channel region according to the index of at least one of the DRS ports 1102 corresponding to the E-CCEs.

Figure 12:
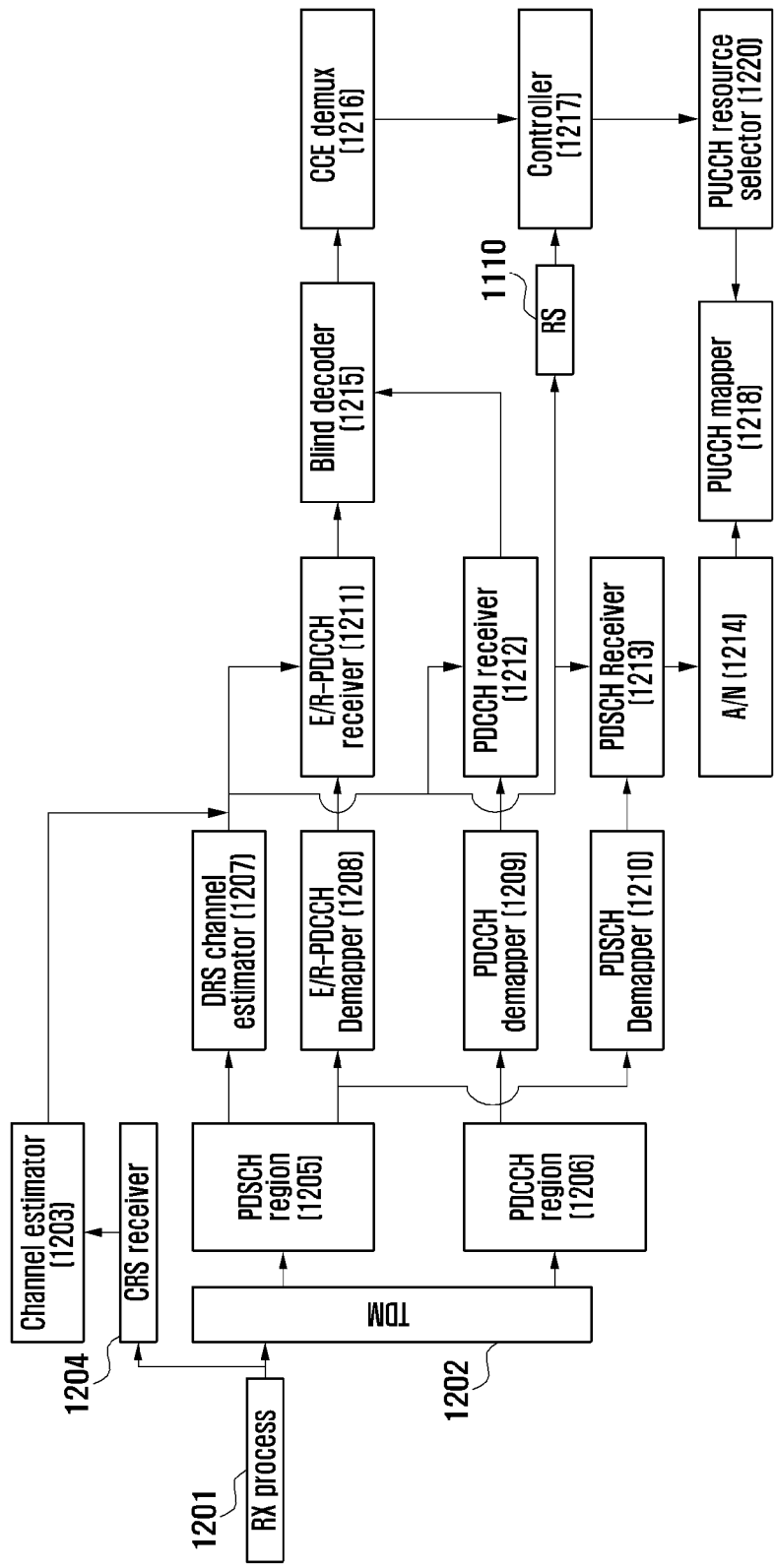
FIG. 12 is a block diagram illustrating a configuration of the receiver of the UE or relay node according to an embodiment of the present invention.

FIG. 12 is a block diagram illustrating a configuration of the receiver of the UE or relay node according to an embodiment of the present invention.

As illustrated in FIG. 12, the UE or relay node includes a receive (Rx) processor 1201, a TDM 1202, a CRS receiver 1024, a channel estimator 1203, a data region receiver 1205, a control region receiver 1206, a DRS channel estimator 1207, an E/R-PDCCH demapper 1208, a PDCCH demapper 1209, a PDSCH demapper 1210, an E/R-PDCCH receiver 1211, a PDCCH receiver 1212, a PDSCH receiver 1213, a response processor 1214, a blind demodulator 1215, a CCE demultiplexer 1216, a controller 1217, a PUCCH demapper 1218, and a PUCCH resource selector 1220.

The Rx processor 1201 receives signals in the reception process. The CRS receiver 1204 receives CRSs, and the channel estimator 1203 acquires channel estimation information from the CRSs. The TDM 1202 separates the PDCCH region and PDSCH region in the subframe. The data region receiver 1205 receives PDSCH region, and the control region receiver 1206 receives PDCCH region. The DRS channel estimator 1207 estimates DRS channel. E/R-PDCCH demapper 1208 demaps the E/R-PDCCH from the PDSCH region, the PDCCH demapper 1209 demaps PDCCH from PDCCH region, and PDSCH demapper 1210 demaps PDSCH from PDSCH region.

The channel estimator 1203 estimates the channel using the channel estimation information acquired using the CRS and the information acquired by the DRS channel estimator 1207, the E/R-PDCCH receiver 1211 receives the E/R-PDCCH demapped by the E/R-PDCCH demapper 1208, the PDCCH receiver 1212 received the PDCCH demapped by the PDCCH demapper 1209, and the PDSCH receiver 1213 receives the PDSCH demapped by the PDSCH demapper 1210. The blind demodulator 1215 performs blind decoding on the control channel received by the PDCCH receiver 1212 and the E/R-PDCCH receiver 1211 to select the CCE carrying the scheduling information for the UE or relay node. The CCE demultiplexer 1216 demodulates the CCE into control channel of the UE or relay node. Here, the PDSCH receiver 1213 receives the PDSCH using the scheduling acquired from the received control channel. The response processor 1214 determines whether the PDSCH receiver 1213 has received the PDSCH successfully.

The controller 1217 detects the lowest CCE index and the DRS port used in the control channel received on the PDCCH or E/R-PDCCH. The PUCCH resource selector 1220 selects the ACK/NACK resource of the uplink response channel for transmitting the information whether the data channel is received successfully, using the detected CCE index and DRS port. The PUCCH mapper 1218 maps the uplink ACK/NACK resource to PUCCH.

In the receiver of the UE or relay node according to an embodiment of the present invention, the controller 1217 checks the index of DRS port corresponding to the E-CCE when the scheduling information is received from the transmitter via E/R-PDCCH. For this purpose, the controller 1217 can use the blind demodulator 1215. The response processor 1214 receives and demodulates PDSCH and determines whether the PDSCH is demodulated successfully. The PUCCH resource selector 1220 determines the ACK/NACK resource by referencing the E-CCE index and the DRS port index. The PUCCH mapper 1218 transmits information on the PDCCH is demodulated successfully, using ACK/NACK resource.

As described above, the resource mapping method and apparatus of the present invention facilitates configuring uplink ACK/NACK response channel corresponding to the downlink control channel supporting SDMA and allows the eNB to allocate resources dynamically according to the number of DRS ports used by the eNB. Also, the resource mapping method and apparatus of the present invention is capable of improve resource efficiency by sharing the LTE ACK/NACK resource without additional resource allocation. Furthermore, the resource mapping method and apparatus of the present invention is advantageous to use the uplink ACK/NACK response channel independently even when a physical resource is used for multiple control channels by means of spatial multiplexing. The resource mapping method and apparatus of the present invention is capable of improving resource efficiency and multiplexing LTE ACK/NACK channel and LTE-A ACK/NACK channel.

While the invention has been shown and described with reference to certain embodiments thereof, it will be understood by those skilled in the art that various changes in form and detail may be made therein without departing from the spirit and scope of the invention as defined in the appended claims and their equivalents.

What is claimed is:

1. A resource mapping method of a transmitter, comprising:
   allocating, in a dedicated control channel region, dedicated control resources
   mapping the allocated dedicated control resources into a data channel region; and
   transmitting the allocated dedicated control resources as mapped in the data channel region,
   wherein the dedicated control resources are used for allocating an uplink response resource according to resource indices and Dedicated Reference Signal (DRS) port indices.

2. The resource mapping method of claim 1, wherein allocating dedicated control resources comprises:
   assigning, when the resource indices are identical with each other and the DRS port indices are different from each other, the dedicated control resources to the same Physical Resource Block (PRB);
   assigning, when the resource indices are different from each other and the DRS port indices are identical with each other, the dedicated control resources to different PRBs; and
   assigning the dedicated control resources to an entire bandwidth of the data channel region or at least one PRB in the entire bandwidth.

3. The resource mapping method of claim 1, wherein allocating dedicated control resources comprises:
   determining a start point of the dedicated control resources in the dedicated control channel region; and
   assigning the dedicated control resources from the start point in the dedicated control channel region.

4. The resource mapping method of claim 3, wherein assigning the dedicated control resources comprises at least one of:
   assigning the dedicated control resources in ascending order of the DRS port index, the resource index increasing per DRS port index;
   assigning the dedicated control resources in ascending order of the DRS port index, the DRS index increasing per the resource index; and
   assigning the dedicated control resources by multiplexing the DRS port indices per resource index.

5. The resource mapping method of claim 1, wherein the DRS port indices are discriminated by scrambling codes.

6. A resource utilization method of a receiver, comprising:
   receiving control information in a dedicated control channel region of a data channel region;
   demodulating data received in the data channel region by analyzing the control information;
   determining a response resource using dedicated control resources, in the dedicated control channel region, allocated according to resource indices and Dedicated Reference Signal (DRS) port indices; and
   transmitting a demodulation result of the data using the response resource.

7. The resource utilization method of claim 6, wherein the dedicated control resources are assigned to a same Physical Resource Block (PRB) when the resource indices are identical with each other and the DRS port indices are different from each other, and assigned to different PRBs when the resource indices are different from each other and the DRS port indices are identical with each other, and to entire bandwidth of the data channel region or at least one PRB in the entire bandwidth.

8. A resource mapping apparatus of a transmitter, comprising:
   Dedicated Reference Signal (DRS) ports corresponding to respective DRS port indices;
   a controller which allocates, in a dedicated control channel region, dedicated control resources and maps the allocated dedicated control resources into a data channel region; and
   a multiplexer which transmits the allocated dedicated control resources as mapped in a data channel region,
   wherein the dedicated control resources are used for allocating uplink response resource according to resource indices and the DRS port indices.

9. The resource mapping apparatus of claim 8, wherein the controller assigns the dedicated control resources to a same Physical Resource Block (PRB) when the resource indices are identical with each other and the DRS port indices are different from each other, and assigns to different PRBs when the resource indices are different from each other and the DRS port indices are identical with each other, and to entire bandwidth of the data channel region or at least one PRB in the entire bandwidth.

10. The resource mapping apparatus of claim 8, wherein the controller determines a start point of the dedicated control resources in the dedicated control channel region and assigns the dedicated control resources from the start point in the dedicated control channel region.

11. The resource mapping apparatus of claim 10, wherein the controller assigns the dedicated control resources in ascending order of the DRS port index with the resource index increasing per DRS port index, and assigns the dedicated control resources in ascending order of the DRS port index which increases per the resource index, or assigns the dedicated control resources by multiplexing the DRS port indices per resource index.

12. The resource mapping apparatus of claim 9, wherein the DRS port indices are discriminated by scrambling codes.

13. A resource utilization apparatus of a receiver, comprising:
- a receiving processor which receives control information in a dedicated control channel region of a data channel region;
- a demodulator which demodulates data received in the data channel region by analyzing the control information;
- a resource selector which determines a response resource using dedicated control resources, in the dedicated control channel region, assigned according to indices of a resource and Dedicated Reference Signal (DRS) port indices; and
- a controller which controls to transmit a demodulation result of the data using the response resource.

14. The resource utilization apparatus of claim 13, wherein the dedicated control resources are assigned to a same Physical Resource Block (PRB) when the resource indices are identical with each other and the DRS port indices are different from each other, and assigned to different PRBs when the resource indices are different from each other and the DRS port indices are identical with each other, and to entire bandwidth of the data channel region or at least one PRB in the entire bandwidth.

* * * * *